United States Patent
Hackel et al.

(10) Patent No.: US 6,423,935 B1
(45) Date of Patent: Jul. 23, 2002

(54) IDENTIFICATION MARKING BY MEANS OF LASER PEENING

(75) Inventors: Lloyd A. Hackel; C. Brent Dane, both of Livermore; Fritz Harris, Rocklin, all of CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/628,565

(22) Filed: Jul. 31, 2000

Related U.S. Application Data

(60) Provisional application No. 60/183,652, filed on Feb. 18, 2000.

(51) Int. Cl.$^7$ .............................................. B23K 26/00
(52) U.S. Cl. ................................ 219/121.85; 219/121.6
(58) Field of Search .......................... 219/121.85, 121.6

(56) References Cited

U.S. PATENT DOCUMENTS

| | | | |
|---|---|---|---|
| 4,937,421 A | 6/1990 | Ortiz, Jr. et al. ......... 219/121.68 |
| 5,492,447 A | 2/1996 | Mannava et al. ............ 415/200 |
| 5,522,706 A | 6/1996 | Mannava et al. ............ 416/215 |
| 5,525,429 A | 6/1996 | Mannava et al. ............ 428/610 |
| 5,531,570 A | 7/1996 | Mannava et al. ........ 416/241 R |
| 5,568,309 A | * 10/1996 | Rockwell .................... 359/338 |
| 5,569,018 A | 10/1996 | Mannava et al. ............ 415/200 |
| 5,584,586 A | 12/1996 | Casarcia et al. ............. 384/625 |
| 5,584,662 A | 12/1996 | Mannava et al. ........ 416/241 R |
| 5,591,009 A | 1/1997 | Mannava et al. ........ 416/241 R |
| 5,620,307 A | 4/1997 | Mannava et al. ........ 416/241 R |
| 5,671,628 A | 9/1997 | Halila et al. .................... 72/53 |
| 5,674,328 A | 10/1997 | Mannava et al. ............ 148/525 |
| 5,674,329 A | 10/1997 | Mannava et al. ............ 148/525 |
| 5,675,892 A | 10/1997 | Mannava et al. .............. 29/889 |
| 5,730,811 A | 3/1998 | Azad et al. .................. 148/565 |
| 5,735,044 A | 4/1998 | Ferrigno et al. .............. 29/889 |
| 5,741,559 A | 4/1998 | Dulaney ..................... 427/554 |
| 5,742,028 A | 4/1998 | Mannava et al. ...... 219/121.82 |
| 5,744,781 A | 4/1998 | Yeaton .................. 219/121.84 |
| 5,756,965 A | 5/1998 | Mannava et al. ...... 219/121.85 |
| 5,846,054 A | 12/1998 | Mannava et al. ......... 416/219 R |
| 5,846,057 A | 12/1998 | Ferrigno et al. ......... 416/241 R |
| 5,911,890 A | 6/1999 | Dulaney et al. ....... 219/121.85 |
| 5,911,891 A | 6/1999 | Dulaney et al. ....... 219/121.85 |
| 5,932,120 A | 8/1999 | Mannava et al. ...... 219/121.85 |
| 5,935,464 A | 8/1999 | Dulaney et al. ....... 219/121.65 |
| 5,948,293 A | 9/1999 | Somers et al. ......... 219/121.85 |
| 5,951,790 A | 9/1999 | Mannava et al. ............ 148/510 |
| 5,980,101 A | 11/1999 | Unternahrer et al. .......... 374/32 |
| 5,987,042 A | 11/1999 | Staver et al. .................. 372/30 |
| 5,987,991 A | 11/1999 | Trantow et al. ................ 73/624 |
| 5,988,982 A | 11/1999 | Clauer .................... 416/241 R |
| 6,002,102 A | 12/1999 | Dulaney et al. ....... 219/121.85 |
| 6,002,706 A | 12/1999 | Staver et al. ................ 372/108 |
| 6,005,219 A | 12/1999 | Rockstroh et al. ..... 219/121.85 |
| 6,021,154 A | 2/2000 | Unternahrer ................ 372/108 |
| 6,049,058 A | 4/2000 | Dulaney et al. ....... 219/121.84 |
| 6,057,003 A | 5/2000 | Dulaney et al. ............ 427/457 |
| 6,064,035 A | 5/2000 | Toller et al. ........... 219/121.86 |
| 6,075,593 A | 6/2000 | Trantow et al. ............. 356/318 |
| 6,078,022 A | 6/2000 | Dulaney et al. ....... 219/121.85 |
| 6,127,649 A | 10/2000 | Toller et al. ........... 219/121.86 |
| 6,130,400 A | 10/2000 | Rockstroh ................ 219/121.6 |
| 6,144,012 A | 11/2000 | Dulaney et al. ....... 219/121.85 |
| 6,155,789 A | 12/2000 | Mannava et al. ........ 416/241 R |
| 6,198,069 B1 | * 3/2001 | Hackel et al. ........... 219/121.6 |

FOREIGN PATENT DOCUMENTS

GB 2310504 A * 8/1997

\* cited by examiner

*Primary Examiner*—Tom Dunn
*Assistant Examiner*—Zidia Pittman
(74) *Attorney, Agent, or Firm*—John P. Wooldridge; Alan H. Thompson

(57) ABSTRACT

The invention is a method and apparatus for marking components by inducing a shock wave on the surface that results in an indented (strained) layer and a residual compressive stress in the surface layer. One embodiment of the laser peenmarking system rapidly imprints, with single laser pulses, a complete identification code or three-dimensional pattern and leaves the surface in a state of deep residual compressive stress. A state of compressive stress in parts made of metal or other materials is highly desirable to make them resistant to fatigue failure and stress corrosion cracking. This process employs a laser peening system and beam spatial modulation hardware or imaging technology that can be setup to impress full three dimensional patterns into metal surfaces at the pulse rate of the laser, a rate that is at least an order of magnitude faster than competing marking technologies.

43 Claims, 1 Drawing Sheet

IDENTIFICATION MARKING BY MEANS OF LASER PEENING

This application claims priority to Provisional Patent Application Ser. No. 60/183,652, titled "Identification Marking By Means of Laser Peening," filed Feb. 18, 2000, incorporated herein by reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to laser shock processing, and more specifically, it relates to laser peening techniques for providing identification markings on metal and other compressible materials.

2. Description of Related Art

Mechanical systems often require some form of part marking to identify the specific component for replacement, safety evaluation, tracking etc. Painted or printed identification often cannot be used because it fades, burns or wears away. Numbers can be etched or laser marked (vaporized) into the surface but removal of material or melting of material can leave a condition of local stress that can become the initiator of a fatigue or stress corrosion crack that can lead to failure of the component. Identification marks can be stamped into a part leaving a compressive stress but the depth and intensity of the compression is unsatisfactory. A stamp is also not easily changed to uniquely mark individual parts.

Using high power lasers to improve material properties is one of the most important industrial applications of lasers. Lasers can transmit controllable beams of high-energy radiation for metalworking. Primarily, the laser can generate a high power density that is localized and controllable over a small area. This allows for cost effective and efficient energy utilization, minimizes distortions in surrounding areas, and simplifies material handling. Since the laser pulse involves the application of high power in short time intervals, the process is adaptable to high-speed manufacturing. The fact that the beam can be controlled allows parts having complex shapes to be processed. Also accuracy, consistency, and repeatability are inherent to the system.

Improving the strength of metals by cold working undoubtedly was discovered early in civilization, as ancient man hammered out his weapons and tools. Since the 1950s, shot peening has been used as a means to improve the fatigue properties of metals. Another method of shock processing involves the use of high explosive materials in contact with the metal surface.

The use of high intensity laser outputs for the generation of mechanical shock waves to treat the surfaces of metals has been well known since the 1970s. The laser shock process can be used to generate compressive stresses in the metal surfaces adding strength and resistance to corrosive failure.

Lasers with pulse outputs of 10 to 100 J and pulse durations of 10 to 100 ns when condensed to fluences of 50 to 200 J/cm$^2$ are useful for generating inertially confined plasmas on the surfaces of metals. These plasmas create pressures in the range of 10,000 to 100,000 atmospheres and the resulting shock pressure can exceed the elastic limit of the metal and thus compressively stress a surface layer as deep or deeper than 1 mm in the metals. Lasers are now becoming available with average power output meaningful for use of the technique at a rate appropriate for industrial production.

In the process of laser shock processing, a metal surface to be treated is painted or otherwise made "black" that is, highly absorbing of the laser light. The black layer both acts as an absorber of the laser energy and protects the surface of the part from laser ablation and from melting due to the high temperature of the plasma. A thin layer of water, typically 1 to 2 mm, is flowed over this black surface. The water acts to inertially confine or, as it is called, tamp the plasma generated as the laser energy is absorbed in the short time pulse duration, typically 30 ns. Other suitable materials that act as a tamper are also possible. A limitation to the usefulness of the process is the ability to deliver the laser energy to the metal surface in a spatially uniform beam. If not uniform, the highest intensity area of the light can cause a breakdown in the water which blocks delivery of meaningful energy to the painted metal surface. A conventional technique to deliver the laser light to the surface is to use a simple lens to condense the laser output to a power density of roughly 100 J to 200 J per square centimeter. This condensing technique has the limitation that a true "image" of the laser near-field intensity profile is not obtained at the surface. Rather a field intensity representing something between the near and far fields is generated. Diffraction of the laser beam as it is focused down onto the surface results in very strong spatial modulation and hot spots.

Any phase aberrations generated within the beam, especially those associated with operation of the laser for high average power, can propagate to generate higher intensity areas within the beam. These high peak intensity regions cause breakdown in the water layer, preventing efficient delivery of the laser energy to the surface to be treated. Another potential cause of breakdown in the tamping material is the generation of non-linear effects such as optical breakdown and stimulated scattering. In a normal generation of a 10 ns to 100 ns pulse within a laser, the output slowly builds over a time period exceeding several pulsewidths. This slow, weak intensity helps to seed the non-linear processes that require buildup times of 10 s of nanoseconds. In conventional techniques, the pulse output of the laser is "sliced" by an external means such as a fast rising electro-optical switch or by an exploding foil. These techniques can be expensive and can limit reliability.

It would be desirable if a laser peening process could be used to provide identification marking on metals and leave the surface in a state of deep residual compressive stress.

SUMMARY OF THE INVENTION

It is an object of the present invention to provide a method and apparatus for marking compressible components such as those made of metal and plastic.

It is another object of the invention to provide a method and apparatus for producing marks in compressible components that leave the component in a state of deep residual compressive stress.

Other objects of the invention will be apparent to those skilled in the art based on the teachings herein.

The invention is a method and apparatus for marking compressible components. One embodiment of the laser peenmarking system rapidly imprints, with single laser pulses, a complete identification code or three-dimensional pattern and leaves the surface in a state of deep (1 mm to 2 mm depth) residual compressive stress. A state of surface compressive stress in metal and other parts is highly desirable to make them resistant to fatigue failure and stress corrosion cracking. Most current marking techniques such as dot peening and laser engraving leave tensile stress in the surfaces and hence increase the potential for failure. The high quality and unique style of the pattern marked by the laser peening process of the present invention makes the pattern difficult to copy and thus allows such pattern to function as a "water mark" for preventing counterfeiting. This process employs a laser peening system and beam spatial modulation hardware or imaging technology that can be setup to impress full three dimensional patterns into metal surfaces at the pulse rate of the laser, a rate that is at least an order of magnitude faster than competing marking technologies. An alternate embodiment utilizes low power laser pulses that peen individual elements that then make up the matrix or other mark Marking in compressive stress leaves parts highly resistant to fatigue failure and stress corrosion cracking. The laser peening process generates a shock wave as intense as $10^6$ psi that strains a metal surface in a two-dimensional pattern directly correlated to the laser intensity profile at the metal surface. By creating a desired pattern upstream in the light field and imaging this pattern onto the metal surface, the full desired pattern is rapidly printed with each pulse of the laser. By spatially modulating the near field intensity profile of the laser light, a three-dimensionally imaged pattern can be printed into the metal with each pulse of the laser.

A data matrix, comprised of an array of white and black squares can easily be programmed into a spatial light modulator and a chosen matrix printed on a workpiece. This matrix is becoming the accepted marking pattern for airplane and aerospace components. Of particular interest is the ability to print a binary matrix of raised and recessed spots that represents the new marking standard defined by the Aerospace Transport Association 2000 (ATA200). The binary code is formed as a matrix having a perimeter and data contained therein. The perimeter is provided with density indicia for indicating the density of data contained within the matrix. The perimeter is also provided with size indicia for indicating the size of the matrix. By utilizing the density indicia and size indicia, a scanning device is able to calculate the size and information density of the binary code.

The present invention utilizes laser peening to create an enormously greater surface pressure in a metal and other compressible workpieces than provided by stamping and drives a deep (1 mm to 2 mm) intense compressive stress into the workpiece. Beam spatial modulation enables an equivalent stamping of complete identification marks with each laser pulse. Processing can be done at a rate of 5 to 10 marks per second, which is a rate unmatched by any other system. This process will be especially important for marking of critical parts such as aerospace and airplane components.

DETAILED DESCRIPTION OF THE INVENTION

Figure 1:
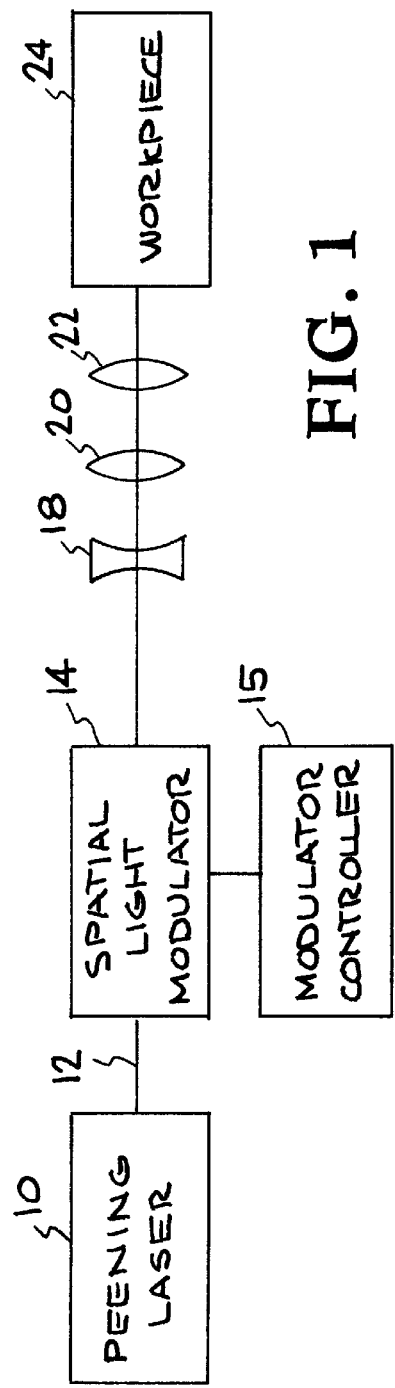
FIG. 1 shows the basic system setup with a spatial light modulator.

Techniques for laser peening are disclosed in U.S. Pat. No. 6,198,069, titled "Laser Beam Temporal And Spatial Tailoring For Laser Shock Processing", incorporated herein by reference and U.S. patent application Ser. No. 09/604,781, titled "Contour Forming Of Metals By Laser Peening" filed Jun. 26, 2000, incorporated herein by reference. Laser technology usable in the present invention is described in U.S. Pat. No. 5,285,310 titled "High Power Regenerative Laser Amplifier," incorporated herein by reference, and U.S. Pat. No. 5,239,408 titled "High Power, high Beam Quality Regenerative Amplifier," also incorporated herein by reference. Embodiments of laser systems usable in the present invention are also described in U.S. Pat. No. 5,689,363 titled "Long Pulse Width, Narrow-Bandwidth Solid State Laser" incorporated herein by reference.

As required, detailed embodiments of the present invention are disclosed herein. However, it is to be understood that the disclosed embodiments are merely exemplary of the present invention. Therefore, specific details disclosed herein are not to be interpreted as limiting, but rather as a basis for the claims and as a representative basis for teaching one skilled in the art to variously practice the present invention.

The invention is a method and apparatus for marking compressible components such as metal components. One embodiment of the laser peenmarking system rapidly imprints, with single laser pulses, a complete identification code or three-dimensional pattern and leaves the surface in a state of deep (1 mm to 2 mm depth) residual compressive stress. A state of compressive stress in metal and other parts is highly desirable to make them resistant to fatigue failure and stress corrosion cracking. Most current marking techniques such as dot peening and laser engraving leave tensile stress in the surfaces and hence increase the potential for failure. The high quality and unique style of the pattern marked by the laser peening process of the present invention makes the pattern difficult to copy and thus allows such pattern to function as a "water mark" for preventing counterfeiting. This process employs a laser peening system and beam spatial modulation hardware or imaging technology that can be setup to impress full three dimensional patterns into metal surfaces at the pulse rate of the laser, a rate that is at least an order of magnitude faster than competing marking technologies.

Marking in compressive stress leaves parts highly resistant to fatigue failure and stress corrosion cracking. The laser peening process generates a shock wave as intense as $10^6$ psi that strains a metal surface in a two-dimensional pattern directly correlated to the laser intensity profile at the metal surface. By creating a desired pattern upstream in the light field and imaging this pattern onto the metal surface, the full desired pattern is rapidly printed with each pulse of the laser. By spatially modulating the near field intensity profile of the laser light, a three-dimensionally imaged pattern can be printed into the metal with each pulse of the laser.

An embodiment of the laser system and optical setup used in the present invention is described in U.S. Pat. No. 6,198,069, titled "Laser Beam Temporal And Spatial Tailoring For Laser Shock Processing" incorporated herein by reference. In the present system, a spatial light modulator is inserted at the image plane before the imaging lenses. The modulator is connected with a control computer that programs the desired pattern for each laser pulse. The area to be peen printed can be illuminated a single or multiple number of times depending on the desired depth of profile to be printed and the desired residual compressive stress to be impressed in the area.

Systems for generating a laser beam suitable for use in the present invention are described in the incorporated patents and applications. In the present laser peenmarking process, an image of a desired pattern is generated in the near field of the laser beam. This can be done in a variety of ways. One embodiment generates a desired pattern with a simple binary mask. Another embodiment uses a more sophisticated spatial light modulator to generate a desired pattern in the near field of a laser beam.

FIG. 1 shows an embodiment of a basic setup for laser peenmarking. A peening laser 10 produces a laser beam 12 that is modulated by spatial light modulator 14 controlled by modulator controller 15. The modulator 14 creates a two-dimensional intensify profile on the laser beam 12. The profile is imaged by the three lenses 18, 20 and 22 onto the workpiece 24. This three lens imaging system transfers the near field image of the laser bean 12, as modulated by the liquid crystal spatial light modulator 14, onto the workpiece 24. The shock created by the laser peening process indents the desired profile into the part. The three lens optical setup images the near field spatial profile of laser beam 12 onto the material surface without going through a focus. By utilizing this optical system to pattern the near field intensity in a desired spatial format, a desired pattern is impressed onto the material surface through the generated shock wave and resulting strain of the material. This patterning can be achieved by controlling the 2-dimensional relative intensity profile of the beam at the first image plane where the beam can be made appropriately large so that optical components can be inserted without the potential for laser induced optical damage. A tamping material is placed on the work piece The metal is covered with a layer of material that absorbs the laser light. A thin layer of water is flowed over the absorptive material and illuminated by the laser. By sequentially applying laser pulses in a raster scan fashion, compressive stress is induced over the illuminated surface. The stress will in turn generate a strain of the top layer of metal and produce a curvature to the material.

The spatial light modulator consists of a liquid crystal screen and a polarizing element. Individual pixels in the screen can be automatically programmed to rotate the beam polarization such that patterns of light and dark are generated to create the image. The setup can be programmed in a "binary" mode where the light intensity is either fully on or fully off. Additionally, grey-scale images can be generated where the material deformation will be proportional to the transmitted intensity.

A spatial light modulator (SLM) may be used for generating 2-D images. SLMs function in a manner similar to a liquid crystal display on a laptop computer. The display or modulator consists of a liquid crystal material sandwiched between two polarizing plates. A matrix array (described herein as x and y coordinates) of electrodes is patterned onto one of the plates so as to control the voltage applied to each matrix elements. When voltage is applied to a specific element it causes the liquid crystal material to change polarization state and thus change the transmission of the specific pixel element. Thus by addressing each specific x and y coordinate with a control voltage generated by the computer, the transmission of the matrix array is controlled to transmit the desired near field light intensity pattern. As a further step the computer control system is programmed to generate a matrix array of control voltages to produce a specific desired pattern in the liquid crystal modulator and to subsequently command the laser to fire an output pulse. As the output pulse passes through the modulator the desired near field pattern is transferred to the beam and it is then imaged onto the workpiece, peening in the desired pattern.

Boulder Nonlinear Systems Inc., e.g., makes a modulator for creating diffraction gratings. These SLM-based subsystems are used for real-time, non-mechanical multi-spot scanning of laser beams. This company provides technology in the form of numerically efficient computer algorithms that provide real-time design of the electrical control voltages required to obtain desired diffraction patterns. See also D. J. McKnight, K. M. Johnson, and R. A. Serati, "256×256 liquid-crystal-on-silicon spatial light modulator," Appl. Opt. Vol. 33, No. 14 pp. 2775–2784, (May 10, 1994), incorporated herein by reference, for a discussion of modulator technology and a description of liquid crystal spatial light modulators (SLMs).

The spatial light modulator can be either a transmissive or reflective device that can control, on some pixilized basis, the near field intensity profile of the laser beam. Pixel control could be as course as the density matrix to be printed. For example a 12×12 density matrix could be printed by as few as 144 square pixels controlling the near field transmission of the near field beam. In contrast a 12×12 density matrix could be printed by 1200×1200 array where individual elements of the density matrix are made up of 100×100 pixels. Pixel intensity can be controlled by reflection, transmission or change in angle. For a reflective device, the near field laser beam is made incident on the modulator and the modulator reflectivity is controlled to reflect a pattern of high and low intensity corresponding to the desired density matrix pattern to be printed. In a transmissive device, the transmission of the near field intensity is adjusted to create the desired pattern. In an angle controlled device, an array of mirrors is controlled in angle to deflect desired pixels of the beam off axis such that they can be scraped off by an aperture stop down stream as for example near the focus of a relay telescope. The individual elements of the spatial light modulator are controlled by a computer and appropriate control element. For example, prior to printing a desired series of density matrices are loaded into the computer and then just prior to a given laser shot, a specific density matrix is recalled and specific control signals generated by the computer to command the individual pixel elements to change transmission, reflection or adjust angle. This adjustment is done for each pixel in the array and is repeated on a shot by shot basis for each density matrix to be printed. It is also of significance to note that most characters or shapes can be printed with the application of compressive stress to a surface. This enables, e.g., the three-dimensional printing of company logos or any alphanumeric coding.

Referring again to FIG. 1, modulator 14 may be replaced with a variety of alternate optical components that modify the beam intensity profile. A glass plate, with area etched to diffuse light has worked well. When using a glass plate with fixed pattern, a different plate is required for each desired pattern. A diffractive optic element coupled with a lens could also be used to create an intensity profile at the workpiece. Again the key is that the image is printed in a form that leaves a residual compressive stress in the surface of the metal.

Peening marking of image profiles requires a high fluence laser beam and this high-energy requirement can be problematic in the selection and use of a spatial light modulator. Liquid crystal displays are limited in the fluence (J/cm2) that they can handle such that the near field beam to be imaged has to be expanded to large size to reduce the local fluence in the modulator. Alternatively, the technique using beam deflection can employ mirror segments that can handle a much high fluence.

Figure 2:
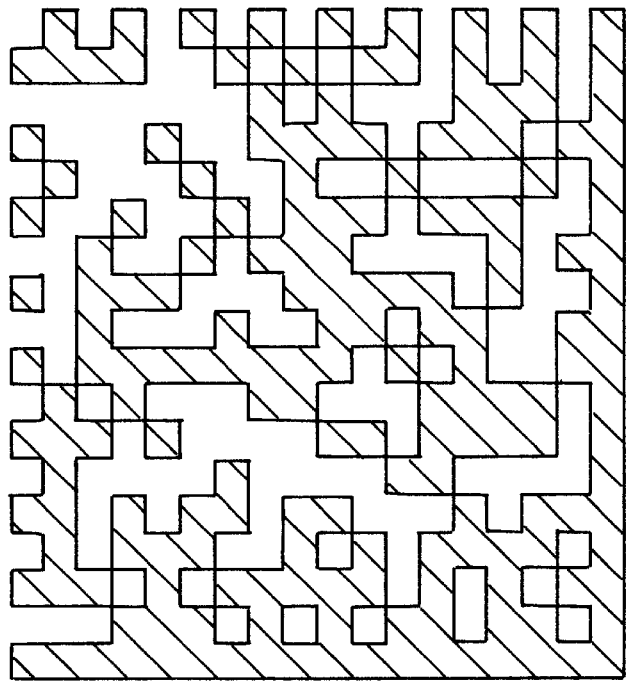
FIG. 2 shows an ATA 2000 data matrix producible with the present invention.

A data matrix, comprised of an array of white and black squares can easily be programmed into a spatial light modulator and a chosen matrix printed on a workpiece. This matrix is becoming the accepted marking pattern for airplane and aerospace components. Of particular interest is the ability to print a binary matrix of raised and recessed spots that represents the new marking standard defined by the Aerospace Transport Association 2000 (ATA200). FIG. 2 shows a typical ATA 2000 matrix. The character string that it represents is HT854_9127M901_809_07_1599. Such character strings are described in U.S. Pat. Nos. 4,939,354, 5,053,609 and 5,124,536, incorporated herein by reference. These patents provide a machine-readable binary code that is dynamically variable in size, format and density of information. The binary code is formed as a matrix having a perimeter and data contained therein. The perimeter is provided with density indicia for indicating the density of data contained within the matrix. The perimeter is also provided with size indicia for indicating the size of the matrix. By utilizing the density indicia and size indicia, a scanning device is able to calculate the size and information density of the binary code. This code is marketed under the product name "Data Matrix" from RVSI Acuity CiMatrix. The Data Matrix symbology employs Reed-Solomon error correction with data redundancy to guarantee a fast and accurate read. The symbol can store between one and 3116 numeric characters or 2335 alphanumeric. While Data Matrix is easily scalable between a 1-mil square to a 14 inch square, the actual limits are dependent on the fidelity of the marking device and the optics of the reader. This allows a user to create user designed Data Matrix symbols.

This Data Matrix symbol contains the SRC mailing address consisting of more than 110 alphanumeric characters. When printed on a 600 dpi (dots per inch) printer at an effective size of 0.300" square (about the size of your 'pinky' finger nail), the symbol can be reliably decoded with any RVSI Acuity CiMatrix 2D reader.

The most popular applications for Data Matrix are the marking of small items such as integrated circuits and printed circuit boards. However, the biggest advantage is that Data Matrix can be utilized for Direct Part Marking (DPM), eliminating labels and the problems/cost associated with them. With the right process, just about any material can be marked with a Data Matrix symbol. The SRC is continually coming up with new methodologies/technologies for direct part marking and also, revisiting older technologies for redeployment.

The Data Matrix code is generally 'read' by a CCD (charged coupled device) video camera (imagers). Typical symbols between ⅛" square and 7" square can be read at distances ranging from contact to 36 inches away. Since the overall size of the Data Matrix symbol is infinitely scaleable, the Data Matrix symbols can be read at virtually any distance, given the right combination of Data Matrix size and reading equipment. This process of laser peen marking has primary application in marking of metals but is not limited to this application. Any material, such as plastic, that undergoes plastic deformation above a specific limit and holds a compressive stress is a candidate for use of the process. Other examples would be protective metal coatings applied over metal substrates.

Interest has been shown in a low cost version of a system that would create a mark while inducing a residual compressive stress. A 100 mJ to 200 mJ laser pulse can be condensed to a fluence of 60 J/cm$^2$ to 200 J/cm$^2$ (depending on the particular metal) onto a metal part that is prepared for peening to produce an indented spot with residual compressive stress. The part can be systematically moved, or the laser beam moved with respect to the part (the beam can be moved with a mirror or simply by moving the condensing lens in the appropriate xy fashion). One or several pulses of the laser are used to print each indented spot. In this manner an entire density matrix or other pattern can be printed. This system requires about 200 mJ output rather than 20 J output and thus would be much less expensive. However it would lack much of the high resolution (important to eliminate counterfeit parts) and speed of the higher power system. Both systems have value and utility.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

We claim:

1. A method for marking a compressible component, comprising:
   producing at least one laser pulse comprising a two-dimensional intensity profile;
   spatially modulating said two-dimensional intensity profile to produce a laser marking pulse; and
   compressing a desired mark onto a compressible workpiece by imaging said laser marking pulse onto an ablation layer in contact with said compressible workpiece, wherein said laser marking pulse comprises a fluence adequate to produce a surface of said desired mark that comprises residual compressive stress.

2. The method of claim 1, wherein the step of producing at least one laser pulse comprises producing said at least one laser pulse with a wavefront corrected laser.

3. The method of claim 2, wherein said wavefront corrected laser system comprises (i) an oscillator with a near field image plane, (ii) a multipass amplifier with a mid-plane and (iii) at least one internal stimulated Brillouin scattering phase conjugator with an input plane, the method further comprising controlling the wavefront of said at least one laser pulse by optically relaying said near field image plane to about said mid-plane and relaying about said midplane to about said input plane.

4. The method of claim 1, wherein the step of spatially modulating said two-dimensional intensity profile comprises passing said at least one laser pulse through a binary mask.

5. The method of claim 1, wherein the step of spatially modulating said two-dimensional intensity profile comprises spatially modulating said two-dimensional intensity profile with a spatial light modulator.

6. The method of claim 5, wherein the step of spatially modulating said two-dimensional intensity profile comprises passing said at least one laser pulse through a spatial light modulator.

7. The method of claim 5, wherein the step of spatially modulating said two-dimensional intensity profile comprises reflecting said at least one laser pulse from a spatial light modulator.

8. The method of claim 3, wherein the step of imaging said laser marking pulse onto a compressible workpiece includes imaging said near field onto a metal workpiece.

9. The method of claim 8, wherein the step of imaging said near field onto said compressible workpiece includes imaging said near field without allowing said at least one laser pulse to go through a focus.

10. The method of claim of claim 9, wherein the step of imaging said near filed without allowing said at least one laser pulse to go through a focus includes imaging said near field onto said workpiece with a three lens system.

11. The method of claim 5, wherein said at least one laser pulse comprises a polarization, wherein said spatial light modulator comprises an array of individual pixels, the method further comprising programming at least one pixel of said array of individual pixels of said spatial light modulator to rotate said polarization such that patterns of light and dark are generated to create said laser marking pulse.

12. The method of claim 11, further comprising programming said at least one pixel in a "binary" mode where said at least one laser pulse is either fully on or fully off.

13. The method of claim 11, further comprising programming said at least one pixel to generate a grey-scale image where material deformation of said workpiece is proportional to transmitted intensity of said laser marking pulse.

14. The method of claim 5, wherein said spatial light modulator comprises a liquid crystal material sandwiched between two polarizing plates, wherein a matrix array comprising pixel elements of electrodes is patterned onto one of said plates to enable control of voltage applied to each pixel element of said matrix array, the method further comprising applying a voltage to a specific pixel element to selectively cause said liquid crystal material to change polarization state and thus change transmission of said pixel element, wherein by addressing each pixel element with a control voltage, the transmission of said matrix array is controlled to transmit said near field light intensity pattern onto said workpiece.

15. The method of claim 14, wherein the step of applying a voltage to a specific pixel element is carried out with a computer control system programmed to generate a matrix array of control voltages to produce a specific desired pattern in the liquid crystal modulator and to subsequently command the laser to fire an output pulse.

16. The method of claim 5, wherein the step of spatially modulating said two-dimensional intensity profile comprises reflecting said at least one laser pulse from an array of mirrors controlled in angle to deflect desired pixels of said at least one laser pulse off axis.

17. The method of claim 1, wherein the step of spatially modulating said two-dimensional intensity profile is carried out with a beam modulator selected from a group consisting of a glass plate and a diffractive optic.

18. The method of claim 1, wherein the step of spatially modulating said two-dimensional intensity profile includes producing a laser marking pulse that imprints on said workpiece a data matrix.

19. The method of claim 18, wherein said data matrix comprises an array of squares that provides a machine-readable binary code that is dynamically variable in size, format and density of information.

20. The method of claim 19, wherein said binary code comprises a perimeter and data, wherein said perimeter is provided with density indicia for indicating the density of data contained within the matrix and is also provided with size indicia for indicating the size of the matrix.

21. The method of claim 18, wherein said data matrix comprises Reed-Solomon error correction with data redundancy.

22. The method of claim 1, wherein said compressible workpiece is selected from a group consisting of a metal workpiece, a protective metal coating over a workpiece and a plastic workpiece.

23. The method of claim 1, wherein said compressible workpiece comprises any material that undergoes plastic deformation above a specific limit and holds a compressive stress.

24. The method of claim 1, wherein said compressible workpiece comprises metal, wherein the step of producing at least one laser pulse comprises producing at least one laser pulse comprising an intensity within a range of 100 mJ to 200 mJ.

25. The method of claim 24, wherein the step of imaging said at least one laser pulse onto said compressible workpiece further comprises condensing said at least one laser pulse to a fluence within a range of 60 $J/cm^2$ to 200 $J/cm^2$ onto said compressible workpiece to produce an indented spot with residual compressive stress.

26. The method of claim 1, wherein the step of producing at least one laser pulse comprises producing a plurality of consecutive laser pulses.

27. The method of claim 26, further comprising systematically relatively moving said compressible workpiece with respect to said plurality of laser pulses to print a desired pattern.

28. An apparatus for marking a compressible component, comprising:
    means for producing at least one laser pulse comprising a two-dimensional intensity profile;
    means for spatially modulating said two-dimensional intensity profile to produce a laser marking pulse; and
    means for compressing a desired mark onto a compressible workpiece by imaging said laser marking pulse onto an ablation layer in contact with said compressible workpiece, wherein said laser marking pulse comprises a fluence adequate to produce a surface of said desired mark that comprises residual compressive stress.

29. The apparatus of claim 28, wherein said means for producing at least one laser pulse comprises a wavefront corrected laser comprising a near field.

30. The apparatus of claim 28, wherein said means for spatially modulating said two-dimensional intensity profile is selected from a group consisting of a binary mask, a spatial light modulator, an array of mirrors, a glass plate and a diffractive optic.

31. The apparatus of claim 29, wherein said means for imaging said near field onto said compressible workpiece comprises means for imaging said near field without allowing said at least one laser pulse to go through a focus.

32. The method of claim 31, wherein the step of imaging said near filed without allowing said at least one laser pulse to go through a focus includes imaging said near field onto said workpiece with a three lens system.

33. The apparatus of claim 30, wherein said at least one laser pulse comprises a polarization, wherein said spatial light modulator comprises an array of individual pixels, the apparatus further comprising means for programming at least one pixel of said array of individual pixels of said spatial light modulator to rotate said polarization such that patterns of light and dark are generated to create said laser marking pulse.

34. The apparatus of claim 33, further comprising means for programming said at least one pixel in a "binary" mode where said at least one laser pulse is either fully on or fully off.

35. The apparatus of claim 33, further comprising means for programming said at least one pixel to generate a grey-scale image where material deformation of said workpiece is proportional to transmitted intensity of said laser marking pulse.

36. The apparatus of claim 30, wherein said spatial light modulator comprises a liquid crystal material sandwiched between two polarizing plates, wherein a matrix array comprising pixel elements of electrodes is patterned onto one of said plates to enable control of voltage applied to each pixel element of said matrix array, the apparatus further comprising means for applying a voltage to a specific pixel element to selectively cause said liquid crystal material to change polarization state and thus change transmission of said pixel element, wherein by addressing each pixel element with a control voltage, the transmission of said matrix array is controlled to transmit said near field light intensity pattern onto said workpiece.

37. The apparatus of claim 36, wherein said means for applying a voltage to a specific pixel element comprises a computer control system including a program for generating a matrix array of control voltages to produce a specific desired pattern in said liquid crystal modulator and to subsequently command the laser to fire an output pulse.

38. The method of claim 33, wherein said laser marking pulse produces a data matrix on said compressible workpiece, wherein said means for programming at least one pixel comprises a computer with a binary code, wherein said binary code comprises a perimeter and data, wherein said perimeter includes density indicia for indicating the density of data contained within said data matrix and further includes size indicia for indicating the size of said data matrix.

39. The apparatus of claim 28, wherein said laser marking pulse produces a data matrix on said compressible workpiece, wherein said data matrix comprises Reed-Solomon error correction with data redundancy.

40. The apparatus of claim 28, wherein said compressible workpiece is selected from a group consisting of a metal workpiece, a protective metal coating over a workpiece and a plastic workpiece.

41. The apparatus of claim 28, wherein said compressible workpiece comprises any material that undergoes plastic deformation above a specific limit and holds a compressive stress.

42. The apparatus of claim 28, wherein said means for producing at least one laser pulse comprises means for producing a plurality of consecutive laser pulses, the apparatus further comprising means for systematically relatively moving said compressible workpiece with respect to said plurality of laser pulses to print a desired pattern.

43. The apparatus of claim 42, wherein said means for spatially modulating said two-dimensional intensity profile to produce a laser marking pulse comprises turning said at least one laser pulse off or on.

\* \* \* \* \*